United States Patent [19]

O'Dell

[11] Patent Number: 4,560,396
[45] Date of Patent: Dec. 24, 1985

[54] DOWN FLOW FILTER PANEL DUST COLLECTOR

[75] Inventor: Leonard J. O'Dell, Louisville, Ky.

[73] Assignee: Allis-Chalmers Corporation, Milwaukee, Wis.

[21] Appl. No.: 642,589

[22] Filed: Aug. 20, 1984

[51] Int. Cl.⁴ .............................................. B01D 41/02
[52] U.S. Cl. ...................................... 55/287; 55/302; 55/493
[58] Field of Search .................. 55/287, 302, 484, 493

[56] References Cited

U.S. PATENT DOCUMENTS

| | | | |
|---|---|---|---|
| 3,486,309 | 12/1969 | Wild | 55/302 X |
| 3,630,008 | 12/1971 | Revell et al. | 55/493 |
| 3,868,238 | 2/1975 | Mills et al. | 55/302 X |
| 3,898,062 | 8/1975 | Slakey | 55/302 X |
| 4,226,723 | 10/1980 | Purchas | 55/484 X |
| 4,468,240 | 8/1984 | Margraf | 55/302 X |

Primary Examiner—Charles Hart
Attorney, Agent, or Firm—Donald C. McGaughey

[57] ABSTRACT

A dust collector forming vertically oriented filtering panels with downward flow of dirty gases and a quiet zone below the panels for trapping particulates of dust that have been separated from the gases and passed into the quiet zone.

11 Claims, 7 Drawing Figures

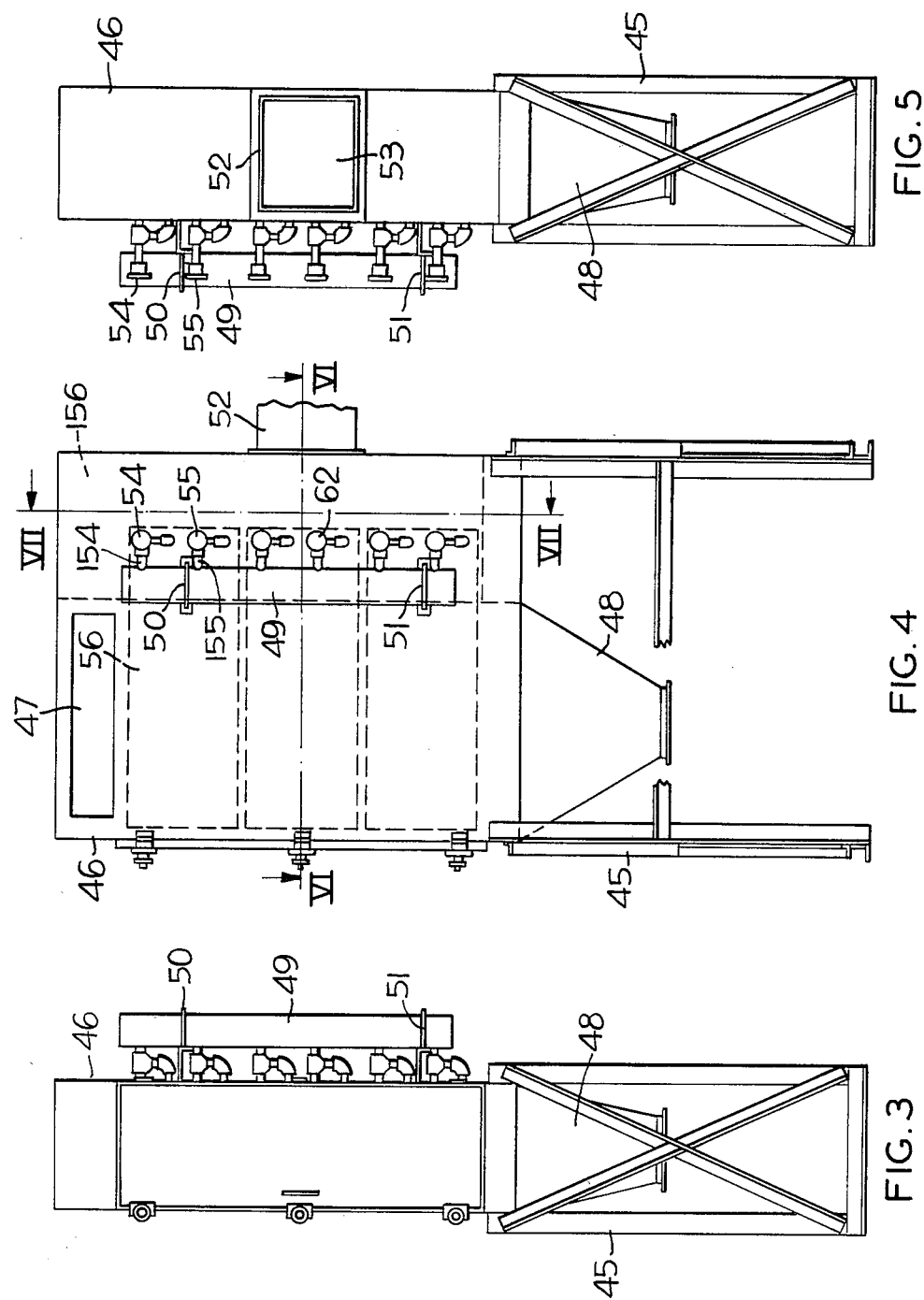

DOWN FLOW FILTER PANEL DUST COLLECTOR

This invention relates to a dust collector for removing particulates from a dirty gas stream and more particularly to vertically oriented filter panels mounted between a dirty gas chamber and a clean gas chamber.

Dust collectors for separating particulates from a dirty gas lose their efficiency as the filters become laden with particulates such as dust from the gas. This increases the differential pressure across the filter and restricts the flow of gas into the clean gas chamber. The filters could be replaced with clean filters to restore the original operating condition of the dust collector but this is costly and often inconvenient and requires downtime in order to service the dust collector. Cleaning devices having a shaking mechanism have been used in dust collectors to dislodge deposits of particulates from filter surfaces. Another type of cleaning device utilizes a pulse of clean gas in a reverse direction through the filter to dislodge collected particulates. While the prior methods for restoring the efficiency of the filters in the dust collector work reasonably well, they all increase the expense of operation. None of the prior dust collectors are directed to using inertia and gravitational forces which are imparted to the particulates to aid in separating them from the dirty gas stream without such particulates depositing upon the filters.

The present invention provides for a dust collector in which the dirty gas goes into a plenum chamber and downwardly across a vertically oriented filtering surface to provide inertia separation as well as gravity separation of the particulates from the dirty gas. To a large extent, the particulates never deposit on the filtered surface and are carried directly to a quiet zone formed by a hopper immediately below the filter. A reverse air pulse system is provided to remove particulates that may have deposited on the filter surface which avoids downtime and any convenience in servicing the filter.

The U.S. Pat. No. 4,272,262, Britt et al., shows a filter and reverse air blast cleaning system. The normal air flow while filtering is upward and the particulates are carried upwardly until they are filtered out on the filtering surface. Although the patent discloses reverse air pulsing for cleaning the filter surfaces as the particulates are loosened from the filtering surface, they must move against the flow of the air stream which tends to redeposit the particulates on the filter. The applicant has provided for down flow of the air stream carrying the particulates toward the hopper. Inertia and gravity provide a separating means of the particulate from the dirty air stream. Accordingly, it is believed the present invention is distinguishable over the Britt et al. patent in the manner of filtering, the manner of cleaning and the overall convenience of operation.

It is an object of this invention to provide a down flow, inertia and gravity separation of particulates from the gas flow in a dust collector.

It is another object of this invention to provide a dust collector having vertically oriented filtering surfaces contacted by a downward flowing dirty gas stream which utilizes the inertia and gravity forces imparted to the particulates in the dirty gas stream to cause some of the particulates to be carried directly into a hopper without being deposited upon the filters.

The objects are accomplished in a dust collector having an inlet air plenum supplying air to a dirty gas chamber having vertically oriented filters for filtering the dirty gas which then flows into a clean gas chamber. The particulates flow parallel to the filtering surfaces and are eventually deposited in a quiet zone formed by a hopper immediately below the filters. A cleaning operation is provided with reverse blasts of clean gas periodically to loosen any particulates that may deposit on the filtering surface and to carry them downstream with the dirty gases for depositing in the hopper immediately below the filters. The dust collector provides continuous operation with a continuous flow of dirty gases from the inlet plenum chamber through the filters in the dirty gas chamber to the clean gas chamber and periodic pulsing to maintain clean operating conditions of the filtering surfaces.

Referring to the drawings,

FIG. 3 is a front view of a modification of the dust collector shown in FIG. 2 with a vertically oriented gas reservoir for pulse cleaning the filters;

FIG. 4 is a side view of FIG. 3;

FIG. 5 is a back view of the filtering dust collector shown in FIGS. 3 and 4;

Figure 1:
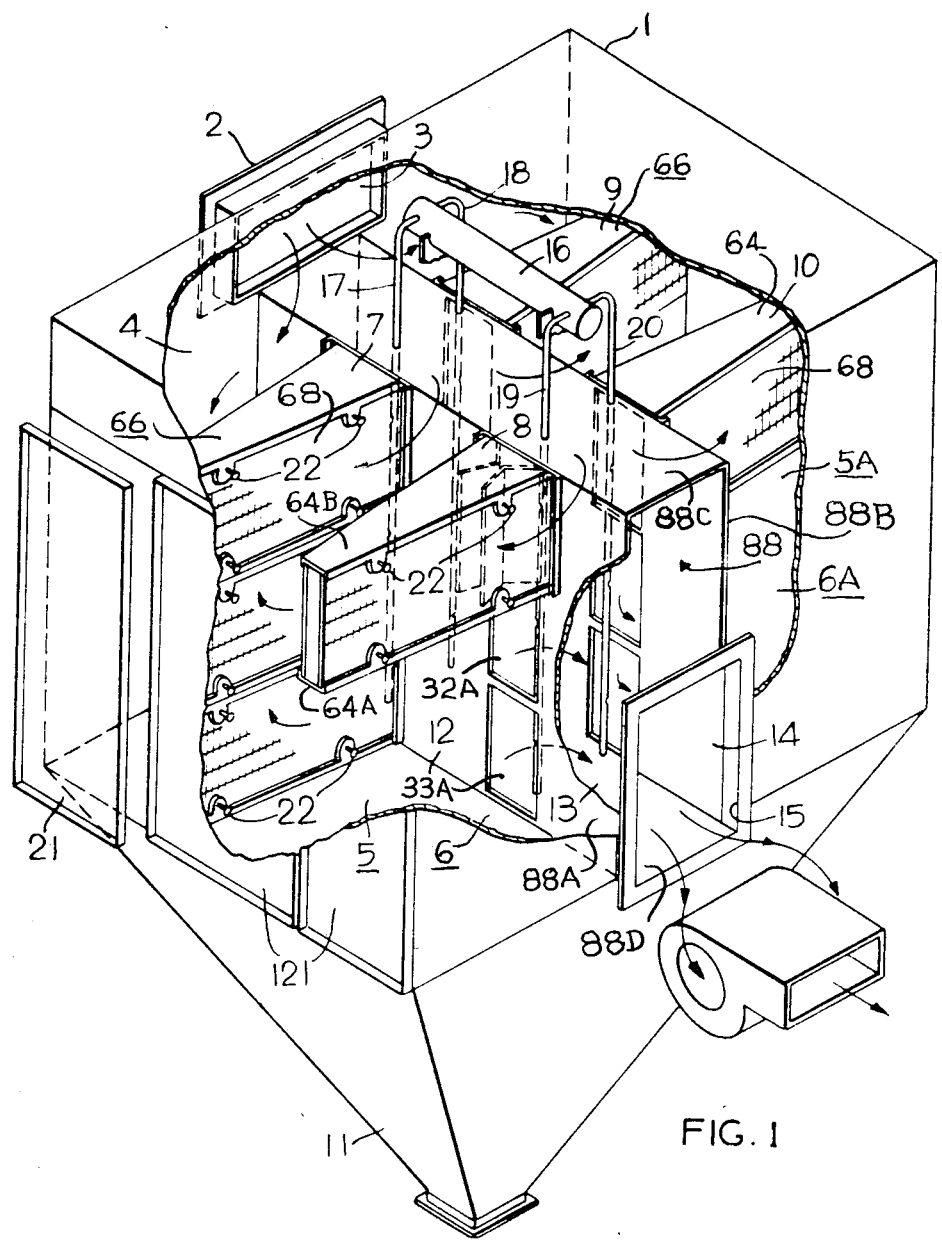
FIG. 1 shows a first embodiment of the dust collector.

Referring to the drawings, the preferred embodiments of this invention are illustrated. FIG. 1 shows the first embodiment of the dust collector. The dust collector comprises a housing 1 having a partition 88 dividing the housing 1 into two vertically extending dirty gas chambers 5, 5A and a single vertically extending clean gas chamber 13. The partition 88 includes two spaced apart vertical side walls 88A, 88B and top and bottom walls 88C, 88D which are mounted in and combine with the housing 1 to form the clean gas chamber 13. The partition side walls 88A, 88B have aperture means, as for example, apertures numbered 32A, 33A in FIG. 1, therethrough connecting the dirty gas chambers 5, 5A in gas flow communication with the clean gas chamber 13. Clean gas chamber 13 has an outlet 15 defining a clean gas outlet passage 14. Each of the dirty gas chambers 5, 5A is subdivided into three zones: an inlet plenum zone 4 which contains a dirty gas inlet 2 defining an inlet passage 3; a filtering zone 6, 6A; and a quiet zone 12 in the form of a hopper 11. The inlet plenum zone 4 is coextensive with and above both of the horizontally spaced filtering zones 6, 6A and the quiet zone 12 is coextensive with and below both of the horizontally spaced filtering zones 6, 6A.

Filter means in the form of vertical filter banks 7, 8, 9 and 10 are mounted in the filtering zones 6, 6A. Each filter bank comprise a plurality of filter assemblies 66 which are shown in more detail in the embodiment shown in FIG. 6. The aperture means 32A, 33A comprise a plurality of apertures in partition walls 88A, 88B arranged in vertically extending rows with each vertical row horizontally spaced from an adjacent vertically extending row of apertures. Each filter assembly 66 includes a filter holder 64, best shown in FIG. 6, and a pair of filters 67, 68. One of the filter holders 64 is mounted in sealed surrounding relation to each of the apertures 32A, 33A, to extend therefrom into the filtering zone. The filter assemblies 66 for each row of apertures are in vertically contiguous relation to each other to form a continuous vertical bank of filter assemblies. Each filter holder 64 has horizontally extending vertically spaced tapered top and bottom walls 64A, 64B each having a wide portion at one end adjacent to the partition and a narrow portion at its other end. The filters 67, 68 (FIG. 6) are mounted in each holder to define a tapered chamber 63 (FIG. 6) and to present flat vertically orientated contiguous filtering surfaces parallel to the downward flow of the dirty gas stream through the filtering zone.

A filter cleaning means is mounted on the dust collector for dislodging some of these particulates that deposit on the filter surfaces back into the downward flowing dirty gas stream. The filter cleaning means includes a reservoir 16 containing compressed clean gas 16 mounted above the clean gas chamber 13 on the inlet plenum zone 13. Conduits 20 are connected to the reservoir 16 and terminate in gas nozzles which direct compressed gas pulses into the tapered chambers to flow in a reverse direction through the filters 67, 68 to dislodge some of the particles collected thereon.

The housing 1 is provided with removable access doors 121. For example, one door 21 is shown in a removed position. Once the doors 121 are removed the filters 67, 68 can be removed by releasing latches 22 on the filter holder 64.

Figure 2:
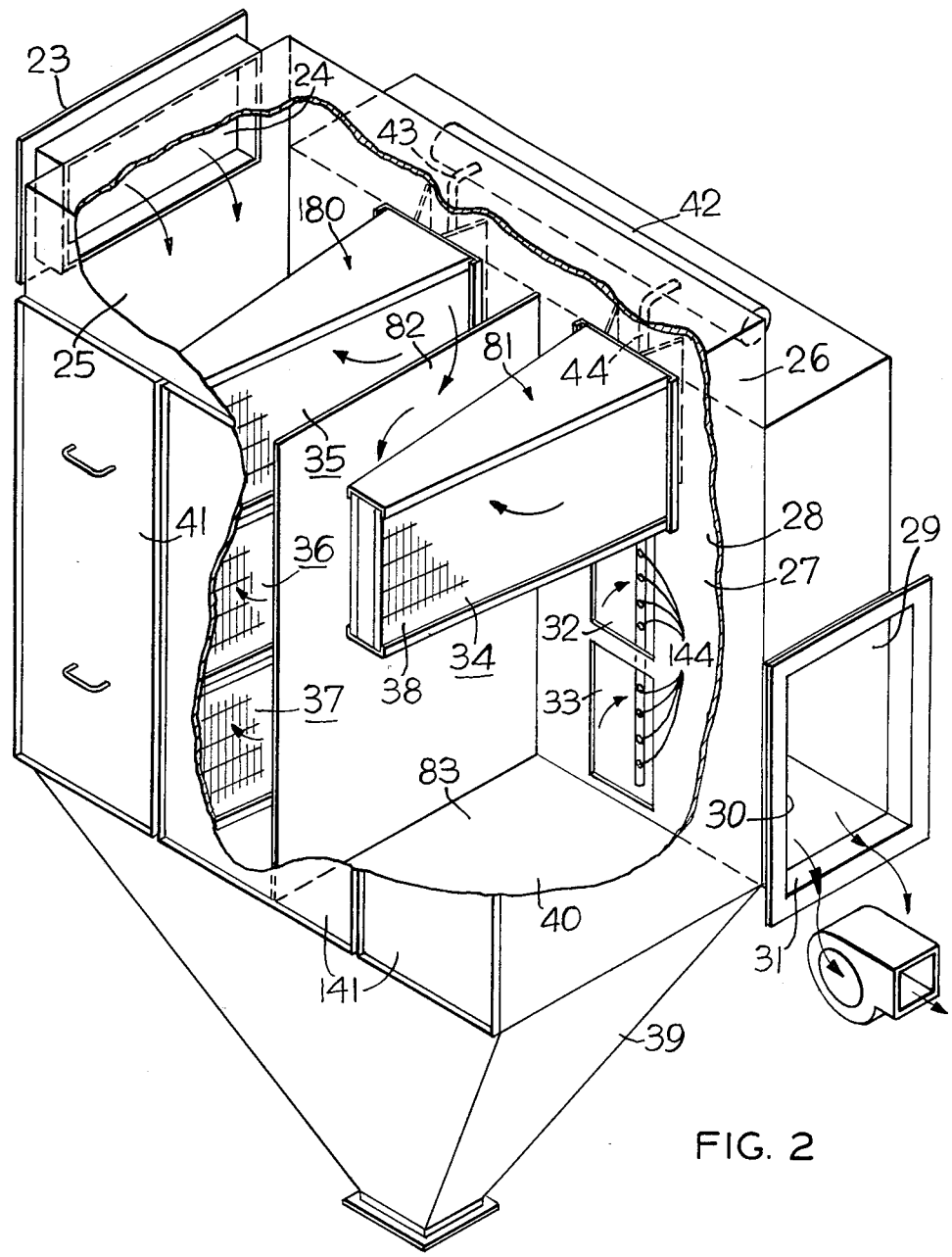
FIG. 2 shows a second embodiment of the dust collector.

FIG. 2 shows a second embodiment of the dust collector which comprises a housing 26 divided by a partition 28 into a single dirty gas chamber 27 and a clean gas chamber 29. The dirty gas chamber 27 is subdivided into three zones: an inlet plenum zone 25 having a dirty gas inlet 23 defining an inlet passage 24; a filtering zone 40 having filter assemblies 34, 35, 36, 37 mounted therein; and a quiet zone 83 constituted by hopper 39. The clean gas chamber 29 is in communication with an outlet passage 30 formed by the outlet 31. A plurality of aperatures are formed in partition 28 of which 32 and 33 are shown. In a completely assembled dust collector all apertures in partition 28, such as apertures 32 and 33 are covered by filter assemblies such as filter assemblies 34, 35, 36 and 37. The filter assemblies each include tapered filter holders 64, shown in FIG. 6, in which filters 38 are mounted. A dislodged particulate barrier wall 82 can be mounted between the filter banks 81 and 180. The hopper 29 operates as a dirt trap for particulates carried in the dirty gas stream downwardly beyond the filters.

Removable access doors 41, 141 are provided with suitable fastening means to fasten them to the housing 26. The access doors 41, 141 can be removed for servicing the filter assemblies within the filtering zone 40.

Figure 7:
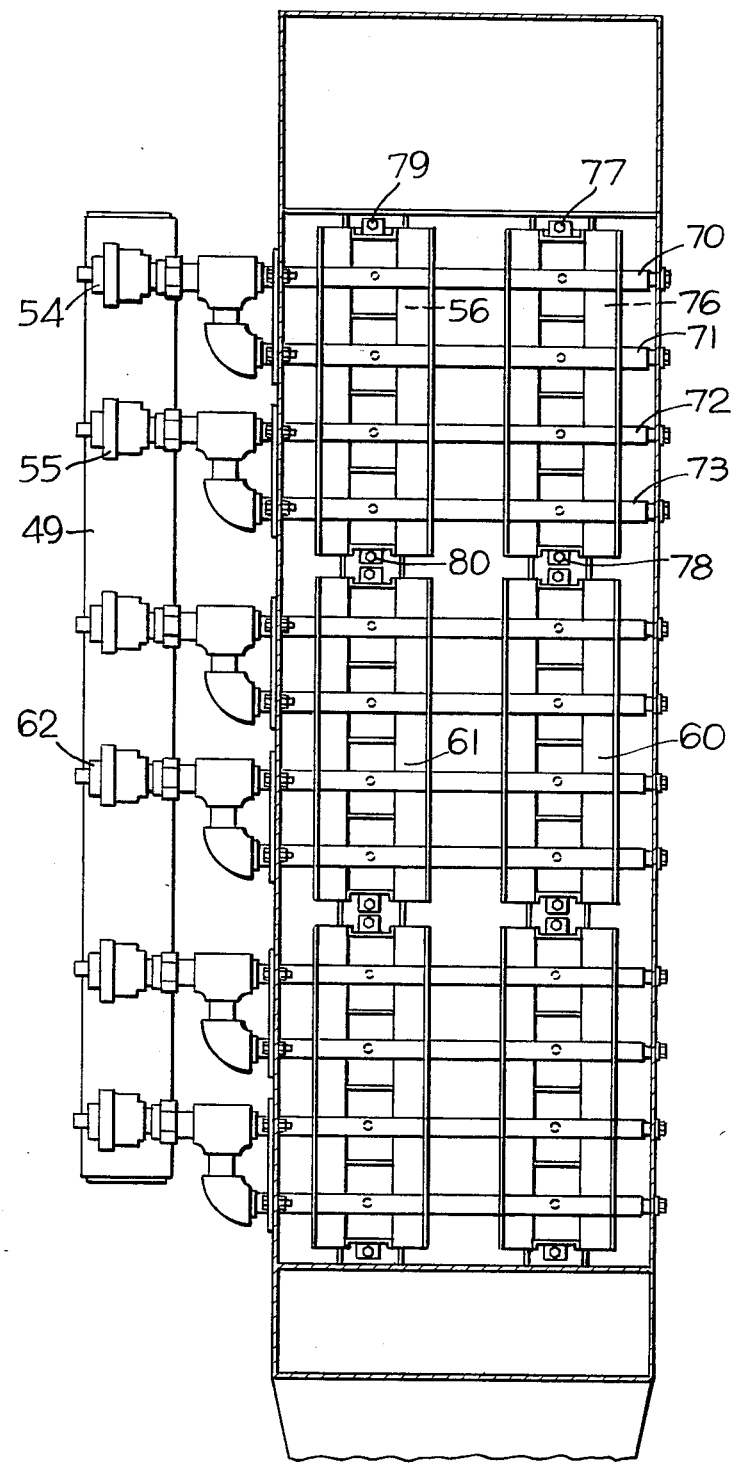
FIG. 7 is an enlarged cross-section back view taken on line VII—VII of FIG. 4.

A compressed air reservoir 42 is mounted externally of the clean gas chamber 29. The compressed air reservoir 42 is in communication through conduits 43 and 44 and suitable sequencing valve arrangements as shown in FIGS. 4 and 7 for pulsing clean gas to the inside of each of the filter assemblies. Gas orifices 144 are provided on the conduits 43 and 44 for directing the pulsed clean gas to the interior filter chambers in the filter assemblies.

Figure 6:
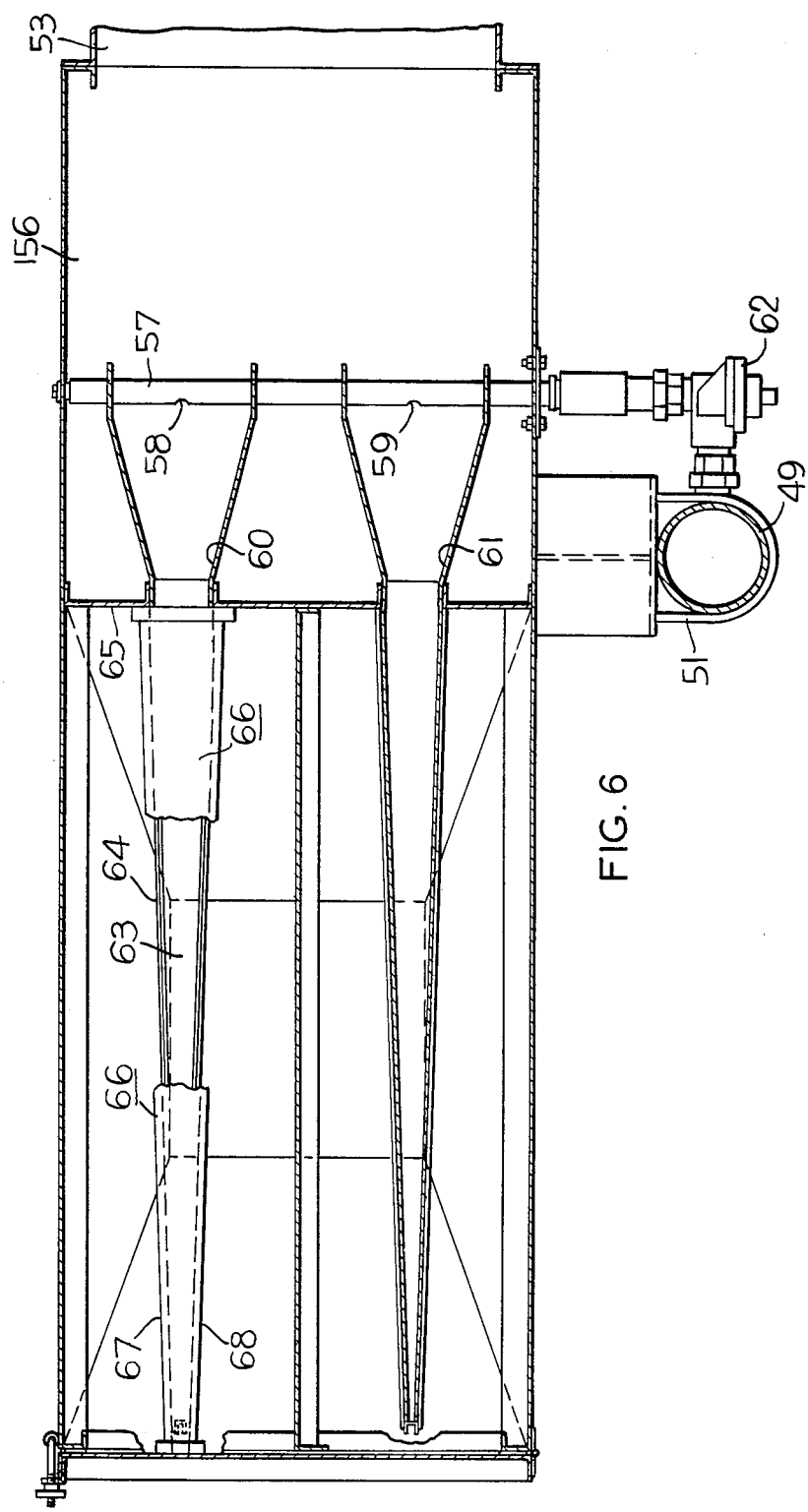
FIG. 6 is an enlarged cross-section view taken on line VI—VI of FIG. 4.

FIGS. 3, 4, 5, 6 and 7 illustrate another modification of the dust collector. A base 45 provides a support for the dust collector which includes a housing 46 having an inlet passage 47. Inlet passage 47 is in communication with an inlet plenum zone immediately above the filtering zone which is above the quiet zone constituted by the hopper 48 similar to that shown in FIGS. 1 and 2. The vertical compressed air reservoir 49 is clamped to the housing 46 by clamps 50 and 51. The outlet 52 defines an outlet passage 53 providing egress for the clean air from the clean gas chamber 156 (FIG. 6). The valves 54 and 55 in conduits 154 and 155 control periodic reverse gas pulsing for the filter assembly 56. Orifices in the conduits are provided for each filter assembly and the sequencing of the valves may be controlled by a pressure responsive device sensing a differential pressure across the filter assembly or may be controlled electronically to periodically reverse pulse filters to provide a clean operating condition of the filters.

FIG. 6 shows the gas pulsing device and the filter assembly 66 in greater detail. The gas pulsing device includes a gas pulsing conduit 57 which contains orifices 58 and 59 that direct clean gas pulses through the rectangular venturi 60 and 61, respectively. The conduit 57 is connected to the valve 62 which is periodically opened to allow reverse pulses of gas to flow through the orifices from the reservoir 49. The tapered interior filter holder chamber 63 is in communication with the venturi 60 which opens into the clean gas chamber 156. The filter assembly is the same in all embodiments and each filter assembly includes a filter holder 64 which is mounted in sealed airtight surrounding relation to an aperture in the partition 65 by a suitable fastening means 77, 78, 79, 80 (FIG. 7). The filters 67, 68 are fastened on the filter holder 64, as previously described, to complete the filter assembly 66. A second filter assembly is also shown in FIG. 6 but as it is identical in construction to filter assembly 66, this second filter assembly will not be described.

As shown in FIG. 7, a single gas reservoir 49 supplies clean gas to both vertical banks of filter assemblies 56 and 76. A total of four vertically spaced conduits 70, 71, 72 and 73 are connected to reservoir 49 to provide the cleaning gas for each filter assembly.

The operation of all embodiments of the dust collector is the same and for convenience, reference will only be made to the FIG. 2 embodiment. The dirty gas flows into the inlet plenum zone 25 through the inlet passage 24. The dirty gas flows down on the opposing sides of the filter banks 80, 181 which are separated by the dislodged particulate barrier wall 82. As the dirty gas flows downwardly, air filters through the filters 38 in each filter assembly and the inertia of the particulates causes them to continue to move downwardly parallel with the filtering surfaces. The greater portion of the particulates continue to pass downwardly as the gas is filtered through the filter assemblies. Particulates passing beyond the lower edge of the filtering assemblies pass into a quiet zone 83 which operates as a dirt trap.

Separation of the particulates from the dirty gas is an inertia process. The heavier particulates in the dirty gas tend to continue in a straight line downwardly parallel to the filtering surfaces. The filter panels are permeable and allow gas to filter through the panels into the clean gas chamber. The particulates not only continue to pass downwardly parallel to the filtering surfaces because of inertia but because of the gravity which operates to carry the particulates downwardly.

Although FIG. 2 shows a horizontal compressed gas reservoir 42, it operates essentially the same as the vertical reservoir 49 shown in FIGS. 3, 4, 5, 6 and 7. Periodically, reverse pulses of compressed gas are reverse pulsed through the filter assemblies. The sequencing of the reverse pulsing is controlled by the valves 54 and 55 which pulse blasts of compressed gas through the venturi 60 and 61 and into the interior of the tapered filtered chambers in the filter assemblies. Since the filters are permeable to gas, the flow of gas in a reverse direction through the filters loosens the particulates that have lodged on the filters. The particulates are dislodged outwardly into the downward gas stream and carried downwardly into the hopper 39 forming the quiet zone 83. The quiet zone 83 allows the particulates to settle out of the gas stream into the hopper 39 from which they can be periodically removed. The dislodged particulate barrier wall 82 prevents the reverse gas pulses from causing particulates to pass laterally from one filter bank to an adjacent filter bank and then redepositing on the filters in the adjacent filter bank. The filtering system is designed primarily to carry the particulates downwardly parallel to the filtering surfaces into the quiet zone where they will be deposited. Although some particulates may deposit on the filtered surfaces, these are loosened and caused to project into the downwardly flowing gas stream and then carried down into the quiet zone of the hopper 39.

The embodiments of the invention in which an exclusive property or privilege is claimed are defined as follows:

1. In a dust collector for removing particulates from a dirty gas stream comprising:

a housing having partition means dividing said housing into a vertically extending dirty gas chamber having a dirty gas inlet and a clean gas chamber having a clean gas outlet, said partition means having aperture means therethrough connecting said dirty gas chamber in gas flow communication with said clean gas chamber, said dirty gas chamber including an inlet plenum zone adjacent the top of said housing and having said dirty gas inlet therein, a quiet zone adjacent the bottom of said housing and a filtering zone between said plenum and quiet zones having a filter assembly operatively mounted therein including filter means to filter said dirty gas stream flowing through said aperture means, the improvement comprising said filter means having a flat filter surface orientated vertically and parallel to a downward flow of said dirty gas stream and the particulates therein through said filtering zone, said quiet zone being below and in direct vertical alignment with said flat vertically orientated filter surface, said filter surface vertical orientation allowing said dirty gas stream to flow straight downwardly through said filtering zone to impart downwardly directed inertia forces to said particulates which combine with gravitational forces on said particulates to maximize the amount of said particulates that pass through said filtering zone into said quiet zone without depositing on said filters, and filter cleaning means for dislodging some of those particulates that do deposit on said filter surface back into the dirty gas stream flowing downwardly parallel to the filter surface to permit said dirty gas stream to reimpart inertia forces to the particulates which combine with gravitational forces to cause some of said dislodged particulates to pass through said filtering zone without redepositing in said filter surface.

2. A dust collector according to claim 1 wherein said aperture means comprises a plurality of apertures arranged in a vertically extending row, one said filter assembly mounted on said partition in sealed surrounding relation to each of said apertures, said filter assemblies in said vertical extending row mounted in vertically contiguous relation to each other to form a continuous vertical bank of filter assemblies with said filters being mounted in said filter assemblies to present flat vertically contiguous filtering surfaces in said vertical bank of filter assemblies.

3. A dust collector according to claim 1 wherein each filter assembly includes a filter holder mounted on said partition in sealed surrounding relation to said aperture means in said partition means to extend out from said partition means into said filtering zone, and wherein said filter means are mounted in said filter holders to present said vertically oriented filter surfaces.

4. A dust collector according to claim 2 having a plurality of vertically extending rows of apertures, each vertically extending row of apertures horizontally spaced from an adjacent vertically extending row of apertures, and a dislodged particulate barrier wall mounted in said housing between adjacent vertically extending rows of apertures.

5. A dust collector according to claim 3 wherein said filter holder was horizontally extending vertically spaced top and bottom walls each having a wide portion adjacent said partition means tapering to a narrow portion remote from said partition means said filters operatively mounted between said spaced top and bottom walls to define a tapered chamber in surrounding relation to said aperture means.

6. In a dust collector for removing particulates from a dirty gas stream comprising:

a housing having top and bottom portions and partition means dividing said housing into a vertically extending dirty gas chamber having a dirty gas inlet and a clean gas chamber having a clean gas outlet, said partition means having aperture means therethrough connecting said dirty gas chamber in gas flow communication with said clean gas chamber, said dirty gas chamber including an inlet plenum zone having said dirty gas inlet therein at the top portion of said housing, a quiet zone at the bottom portion of said housing and a filtering zone between said plenum and quiet zones having a filter assembly operatively mounted therein including filter means to filter said dirty gas stream flowing through said aperture means, the improvement comprising:

said partition means including two spaced apart vertical side walls and top and bottom walls mounted in said housing and cooperating therewith to form said clean gas chamber, said clean gas chamber extending vertically in said housing to divide said housing into two horizontally spaced vertically extending filtering zones, each of said partition means side walls having aperture means therethrough said filter means including a filter operatively mounted in gas filtering relation with said aperture means, each of said filter having a flat filter surface orientated vertically and parallel to a downward flow of said dirty gas stream and the particulates therein through said filter zone, said filter surface vertical orientation allowing said dirty gas stream to flow straight downwardly through said filtering zone and impart downwardly directed inertia forces to said particulates which combine with gravitational forces on said particulates to maximize the amount of particulates that pass through said filtering zone without depositing on said filter surfaces, and filter cleaning means including a device for dislodging some of those particulates that do deposit on said filter surfaces back into the dirty gas stream flowing downwardly parallel to said filter surfaces to permit said dirty gas stream to reimpart inertia forces to the dislodged particulates which combine with gravitational forces to cause some of said dislodged particulates to pass through said filtering zone without redepositing on said filter surfaces.

7. A dust collector according to claim 6 wherein said aperture means comprises a plurality of apertures in each of said walls arranged in a vertically extending row, one of said filter assemblies mounted on said wall in sealed surrounding relation to each of said apertures, said filter assemblies in each of said vertically extending rows mounted in vertically contiguous relation to each other to form a continuous vertical bank of filter assemblies with said filters being mounted in said filter assemblies to present flat vertically contiguous filtering surfaces in said vertical bank of filter assemblies.

8. A dust collector according to claim 7 having a plurality of vertically extending rows of apertures in each of said walls, each vertically extending row of apertures being horizontally spaced from an adjacent vertically extending row of apertures, and a dislodged particulate barrier wall mounted in said housing between adjacent vertically extending rows of apertures.

9. A dust collector according to claim 6 wherein said filter assembly includes a filter holder mounted on each of said side walls in sealed surrounding relation to said aperture means to extend out from said side walls into each of said filtering zones, and wherein said filter means are mounted in said filter holders to present said vertically orientated filter surfaces.

10. A dust collector according to claim 9 wherein said filter holder has horizontally extending vertically spaced top and bottom walls each having a wide portion adjacent said partition means side wall and tapering to a narrow portion, said filters operatively mounted between said spaced top and bottom walls to define a tapered chamber in surrounding relation to each of said apertures.

11. A dust collector according to claim 6 wherein said plenum zone is coextensive with and above both of said horizontally spaced filtering zones and said quiet zone is coextensive with and below both of said horizontally spaced filtering zones.

* * * * *